United States Patent
Del Rossa

(10) Patent No.: US 10,227,960 B2
(45) Date of Patent: Mar. 12, 2019

(54) FUEL INJECTION HOLD DOWN BOLT REPAIR KIT

(71) Applicant: Jeffrey Del Rossa, Pittsburgh, PA (US)

(72) Inventor: Jeffrey Del Rossa, Pittsburgh, PA (US)

( * ) Notice: Subject to any disclaimer, the term of this patent is extended or adjusted under 35 U.S.C. 154(b) by 0 days.

(21) Appl. No.: 15/902,748

(22) Filed: Feb. 22, 2018

(65) Prior Publication Data

US 2018/0238285 A1   Aug. 23, 2018

Related U.S. Application Data

(60) Provisional application No. 62/461,964, filed on Feb. 22, 2017.

(51) Int. Cl.
| | |
|---|---|
| *F02M 61/16* | (2006.01) |
| *F02M 61/14* | (2006.01) |
| *F16B 33/00* | (2006.01) |
| *F16B 13/06* | (2006.01) |
| *F16B 39/04* | (2006.01) |

(52) U.S. Cl.
CPC .......... *F02M 61/168* (2013.01); *F02M 61/14* (2013.01); *F16B 33/002* (2013.01); *F02M 2200/8023* (2013.01); *F02M 2200/8076* (2013.01); *F02M 2200/85* (2013.01); *F16B 13/065* (2013.01); *F16B 39/04* (2013.01)

(58) Field of Classification Search
CPC ...... F02M 61/16; F02M 61/168; F02M 61/14; F02M 2200/8023; F02M 2200/8076; F02M 2200/85; F16B 33/002; F16B 13/065; F16B 39/04
See application file for complete search history.

(56) References Cited

U.S. PATENT DOCUMENTS

| | | |
|---|---|---|
| 2,272,861 A | 2/1942 | Yohpe |
| 3,498,643 A | 3/1970 | Reiss |
| 3,912,306 A | 10/1975 | McCormick |
| 4,481,930 A | 11/1984 | Chadwick |
| 4,730,852 A | 3/1988 | Arscott |
| 4,809,751 A | 3/1989 | McKenzie |
| 5,641,185 A | 6/1997 | Harth |
| 5,961,153 A | 10/1999 | Foster |
| 6,170,530 B1 | 1/2001 | Steblina |
| 7,784,150 B2 | 8/2010 | Anderson et al. |
| 8,777,278 B2 | 7/2014 | Singh et al. |
| 2005/0132532 A1 | 6/2005 | Campbell et al. |
| 2016/0339573 A1 | 11/2016 | Del Rossa |

*Primary Examiner* — Hieu T Vo

(74) *Attorney, Agent, or Firm* — Buchanan Ingersoll & Rooney PC

(57) ABSTRACT

An improved apparatus for repairing fuel injector hold-down bolt holes is disclosed. The apparatus can be readily mounted to the passage through which the fuel injector passes via a flange that fits inside the passage and thus generally avoids the need to remove the engine in order to conduct the repairs. The apparatus further provides guides or bushings that allow for the precise alignment of various tools to repair the hold-down bolt hole.

19 Claims, 6 Drawing Sheets

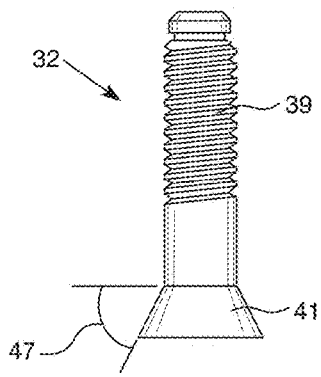
FIG. 10
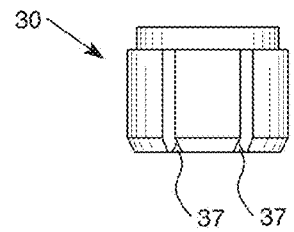
FIG. 11
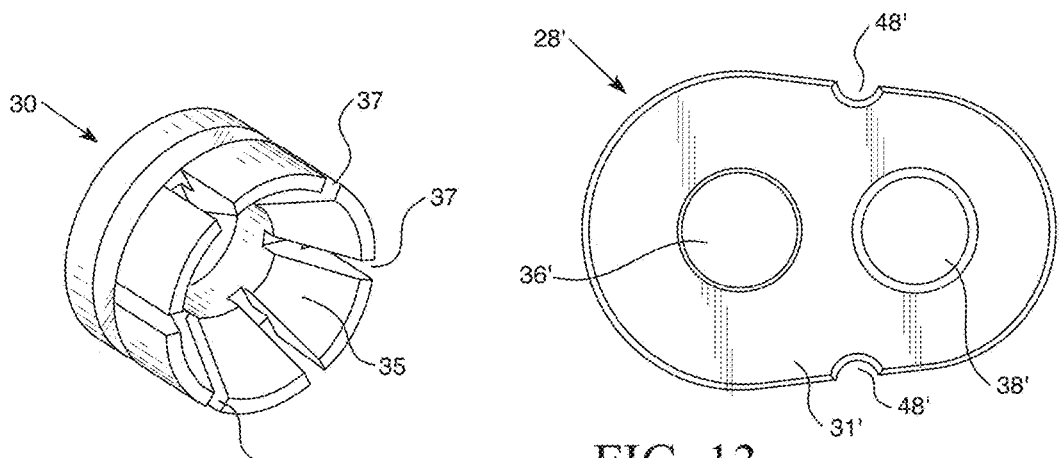
FIG. 12
FIG. 13
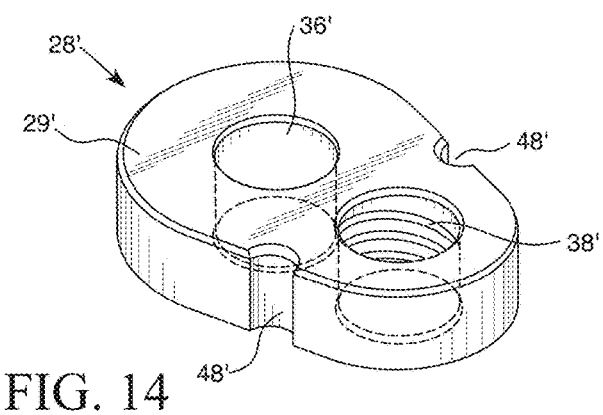
FIG. 14

FUEL INJECTION HOLD DOWN BOLT REPAIR KIT

INCORPORATED REFERENCES

This application claims the benefit of U.S. Provisional Patent Application No. 62/461,964, filed on Feb. 22, 2017, the contents of which are hereby incorporated herein by reference.

FIELD OF THE INVENTION

The present invention generally relates to an apparatus for repairing or restoring a cylinder head fuel injector hold-down bolt hole that secures a fuel injector retaining bolt or fastener in an engine.

BACKGROUND OF THE INVENTION

Modern gas and diesel internal combustion engines require precise control of fuel delivery to a combustion chamber in order to operate at peak performance (such as optimal efficiency, power, reliability, etc.). This fuel control is typically accomplished via a fuel injector, which provides a mechanism for reliably and accurately injecting fuel into the combustion chamber of an internal combustion engine, such as one found in automotive and truck engines. Fuel injectors require frequent service to operate efficiently in dispersing precise amounts of fuel into the combustion chamber. The life cycle of the fuel injector depends on the ability to provide consistent fuel pressure and cylinder head pressure to deliver fuel at incremental moments as determined by the engine's controls and requirements.

Fuel injectors are typically mounted onto an engine by a retaining assembly and are positioned such that the injector can deliver fuel directly into the combustion chamber. The retaining assembly typically consists of a small steel dual fork-like object that straddles the fuel injector and is secured via an injector hold-down bolt that passes through the valve cover and into the cylinder head. Climate, condensation, heat, and the cooling cycles of the engine allow moisture and contaminants to seep into fuel injector mounting cavity, which can cause corrosion that erodes the fastener and seizes it in place. Attempts to remove the fuel injector hold-down bolt after prolonged exposure to conditions indicated above often result in fracturing the retaining bolt. Hot and cold duty cycles can cause the expansion and contraction of key components, which can also cause the fastener to seize and fracture inside the cylinder head.

Attempts to service or simply replace the fuel injector, which would require only a few minutes, can also lead to fracturing the fuel injector hold-down bolt inside the cylinder head, requiring over 25 hours of additional repair time to remove the cab of the vehicle, the cylinder head, and the bolt remnant and then restore the threads in the cylinder head, are usually performed by a qualified precision machine shop facility. Depending upon the engine build configuration (e.g. cab and chassis, utility box, flat bed, ambulance, cargo box, or other configurations), the repair could also involve extracting the engine and/or removing and reinstalling the truck body cab, which adds several hours to the overall repair time.

Thus, there is a need for a device that allows a technician to more quickly and easily repair a broken hold-down bolt assembly without having to remove the components from the vehicle, as indicated above.

SUMMARY OF THE INVENTION

Embodiments of the disclosed invention avoid or minimize some of these issues by facilitating and mating the precise alignment of a repair tool to the cylinder head to remove the damaged or broken fastener(s) and facilitate machining of the old fasteners for replacement with new fasteners while the cylinder head assembly and mating components remain fixed in the vehicle. Unlike the previously mentioned methods of repairing the fuel injector hold-down assembly, this invention avoids the timely and expensive process of removing components of the engine, the engine itself in some cases, or the body and cab and can allow the assembly to be repaired in a matter of minutes instead of hours, which substantially reduces the time and cost of repairs.

One embodiment comprises an apparatus for repairing a fuel injector, comprising: a plate with a top surface and a bottom surface; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; and an arbor extending through the flange and the arbor channel.

Another embodiment comprises an apparatus for repairing a fuel injector, comprising: a plate with a top surface and a bottom surface; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; and an arbor extending through the flange and the arbor channel; and a bushing configured to fit inside the repair guide.

Yet another embodiment comprises an apparatus for repairing a fuel injector, comprising: a plate with a top surface and a bottom surface; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; an arbor extending through the flange and the arbor channel; and an alignment guide separate and distinct from the repair guide.

One method of using the invention comprises removing a fuel injector from an engine; placing an apparatus comprised of a plate with a top surface and a bottom surface; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; and an arbor extending through the flange and the arbor channel into a fuel injector passage in the engine by placing the flange in the fuel injector passage; aligning the apparatus so that the repair guide is aligned with the fuel injector hold-down bolt hole in the engine; securing the apparatus into the fuel injector passage; inserting a repair tool through the repair guide; repairing the fuel injector hold-down bolt hole with the repair tool; and removing the apparatus after repairing the fuel injector hold-down bolt hole.

Another method of using the invention comprises removing a fuel injector from an engine; placing an apparatus comprised of a plate with a top surface and a bottom surface; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; an arbor extending through the flange and the arbor channel; a bushing inserted into the repair guide into a fuel injector passage in the engine by placing the flange in the fuel injector passage; aligning the apparatus so that the repair guide is aligned with the fuel injector hold-down bolt hole in the engine; securing the apparatus into the fuel injector passage; inserting a repair tool through the bushing in the repair guide; repairing the fuel injector hold-down bolt hole with the repair tool; and removing the apparatus after repairing the fuel injector hold-down bolt hole.

Yet another method of using the invention comprises removing a fuel injector from an engine; placing an apparatus comprised of a plate with a top surface, a bottom surface, and a side; an alignment guide located in the side; an arbor channel located in the plate; a flange that protrudes from the bottom surface of the plate about the arbor channel and that has a flange radius; a repair guide located in the plate that extends from the top surface through the bottom surface and that has an effective radius, wherein the center of the repair guide is separated from the center of the arbor channel by a distance greater than the sum of the flange radius and the effective radius; and an arbor extending through the flange and the arbor channel into a fuel injector passage in the engine by placing the flange in the fuel injector passage; aligning the apparatus using the alignment guide so that the repair guide is aligned with the fuel injector hold-down bolt hole in the engine; securing the apparatus into the fuel injector passage; inserting a repair tool through the repair guide; repairing the fuel injector hold-down bolt hole with the repair tool; and removing the apparatus after repairing the fuel injector hold-down bolt hole.

DESCRIPTION OF THE DRAWINGS

FIG. 10 is a side view of an arbor.

FIG. 11 is a side view of a flange.

FIG. 12 is a perspective view of a flange.

FIG. 13 is top view of another plate.

FIG. 14 is a perspective view of another plate.

DESCRIPTION OF THE INVENTION

Figure 1:
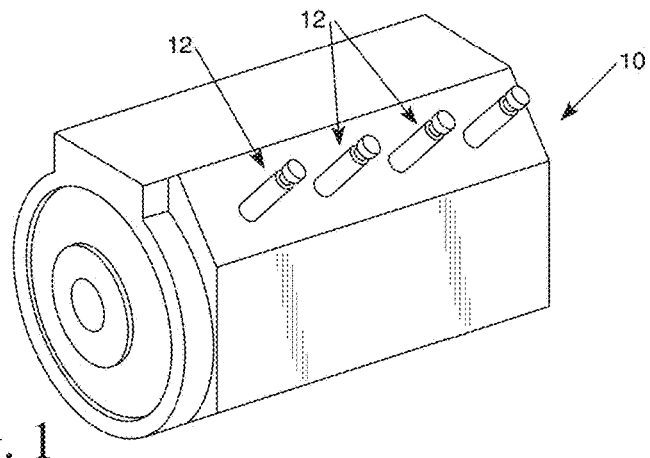
FIG. 1 is a representation of an engine with protruding fuel injectors.

A representation of a diesel engine 10 is shown in FIG. 1. Within the engine are various components, but of particular interest are fuel injectors 12, which are held in place by a dual fork retaining assembly 14 that is secured to engine 10 via a fuel injector hold-down bolt 16 in valve cover 18.

Figure 2:
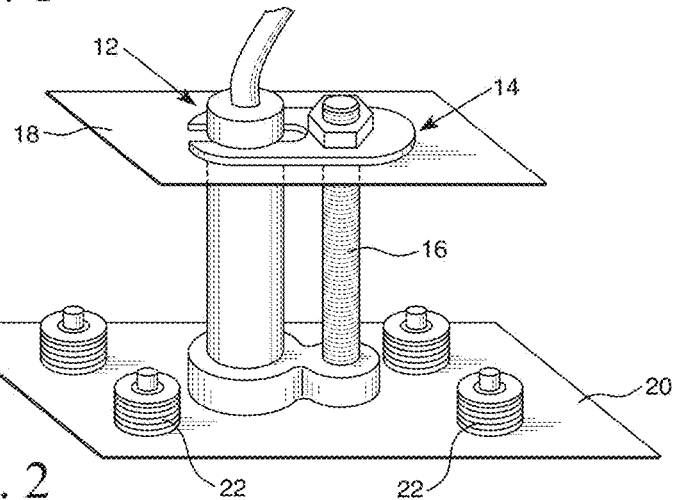
FIG. 2 is a cut-away side view of an engine exposing a fuel injector and a fuel injector hold-down bolt.
Figure 3:
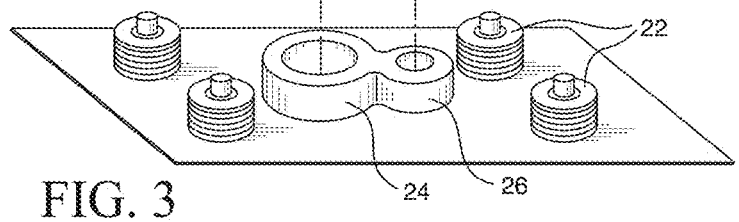
FIG. 3 is a cut-away side view of an engine with a fuel injector and fuel injector hold-down bolt removed.

As shown in FIGS. 2 and 3, fuel injectors 12 pass through a hole 13 in valve cover 18 and extend into cylinder head 20 where they are seated in fuel injector hole/passage 24. Injector hole/passage 24 is surrounded by valve springs 22 and fuel injector hold-down bolt hole 26. FIG. 2 shows a cut-away view of engine 10 where one can see fuel injector 12 seated in fuel injector hole 24 and secured to valve cover 18 via retaining assembly 14 and injector hold-down bolt 16 that passes through hole 15 and screws into injector hold-down bolt hole 26. Injector hold-down bolt 16 is typically a standard, elongated threaded bolt. FIG. 3 shows the engine with fuel injectors 12 and injector hold-down bolts 16 removed and holes 24 and 26 exposed.

Figure 4:
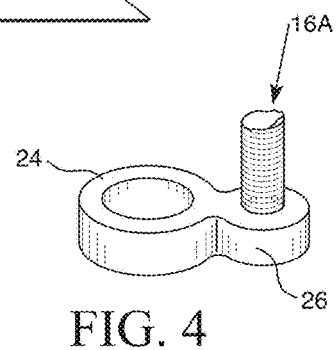
FIG. 4 is a view of a broken fuel injector hold-down bolt in a fuel injector hold-down bolt hole.

With the passage of time and the effect of corrosion, injector hold-down bolt 16 or injector hold-down bolt hole 26 can degrade to the point where they fracture or otherwise become damaged. For instance, during repairs when a technician attempts to unscrew injector hold-down bolt 16, injector hold-down bolt 16 may break or the threads in injector hold-down bolt hole 26 can be damaged. One example of this kind of damage can be seen in FIG. 4. In these instances, it may become necessary to drill out damaged injector hold-down bolt 16A from injector hold-down bolt hole 26 or re-thread injector hold-down bolt hole 26 in order to repair engine 10.

Figure 5:
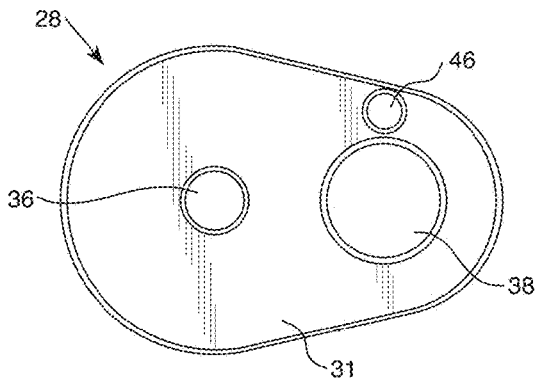
FIG. 5 is a top view of the plate.
Figure 6:
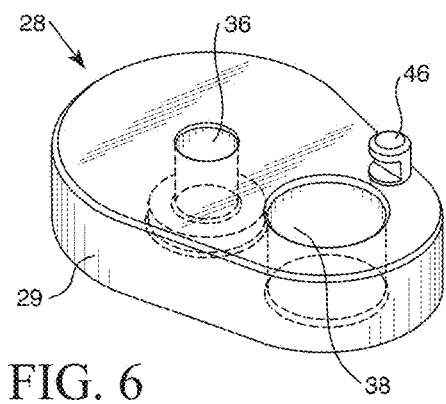
FIG. 6 is a perspective view the plate.
Figure 7:
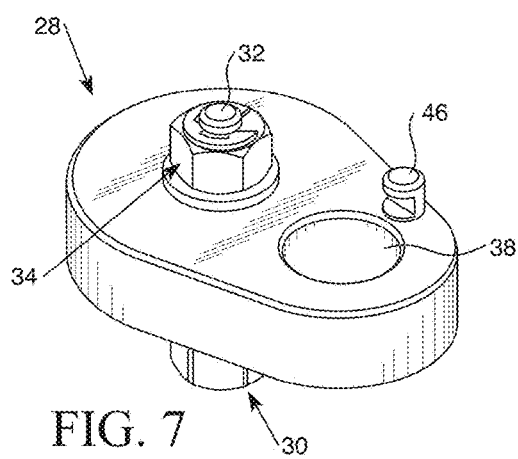
FIG. 7 is a perspective view of an embodiment of the invention.
Figure 8:
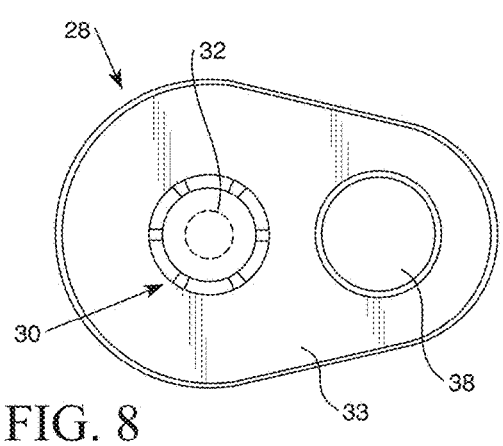
FIG. 8 is a bottom view of one embodiment of the invention.
Figure 18:
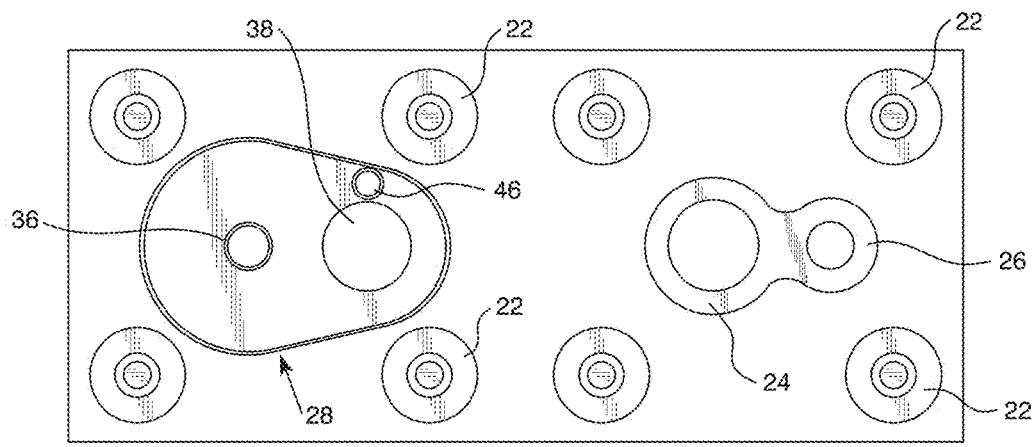
FIG. 18 is a top view of a plate positioned above the fuel injector and fuel injector hold-down bolt holes.

In one embodiment of the invention, tool 28 can be used to repair injector hold-down bolt hole 26 without having to remove the components or entirety of engine 10 from the vehicle. In this embodiment, shown in FIGS. 5 and 6, tool 28 is comprised of a generally oval or ovoid shaped cylindrical plate 29, which is designed such that it is large enough to cover both fuel injector hole 24 and injector hold-down bolt hole 26 and to be precisely aligned using existing exhaust valve components, but small enough to fit within the space around these holes and not interfere with other components in engine 10, such as valve springs 22 (see, e.g., FIG. 18). Tool 28 is made from a rigid material such as type 6061 hard-coated aluminum, although other rigid materials, such as carbon steel, stainless steel, other forms of aluminum, and dense polymers could also be used, and is approximately 2.75" long, 2" wide, and ½" thick. Other shapes and sizes of plate 29 can also fall within the scope of the invention, as long as they can enable plate 29 to be attached to fuel injector hole 24 and enable the repair of injector hold-down bolt hole 26 without interfering with other components inside engine 10.

As shown in FIGS. 5-9, tool 28 is also comprised of an approximately ⅜" diameter arbor channel/hole 36 (which is located on the larger lobe of plate 29) and an approximately ¾" diameter repair guide 38 (which is located on the smaller lobe of plate 29). Both arbor channel 36 and repair guide 38 extend through the entirety of plate 29 from top surface 31 through bottom surface 33, which enables various components to pass through plate 29. Arbor channel 36 facilitates the mounting of tool 28 to fuel injector hole 24. Repair guide 38 facilitates the repair of injector hold-down bolt hole 26 by guiding various tools (such as drill bits and taps, among other things) through tool 28 while the repairs are being conducted. It does not mount, lock, or prevent the rotation of tool 28 in engine 10 or fuel injector hole 24. While arbor channel 36 and repair guide 38 are generally cylindrical in shape, different sizes and shapes of arbor channel 36 and repair guide 38 are possible (such as generally rectangular, square, hexagonal, oval, etc.) and can fall within the scope of the invention.

Pin 46 is located on the top surface 31 of plate 29 (which faces away from injector hold-down bolt hole 26), and flange 30 is located on the bottom surface 33 of plate 29 (which faces towards injector hold-down bolt hole 26). Flange 30 takes the form of a generally slotted cylindrical disk that is sized to fit within fuel injector hole 24. Flange 30 can be permanently attached to the underside 33 of plate 29 around arbor channel 36 or can be a removable component that either rests against the underside 33 of plate 29 around arbor channel 36 or attaches or fits into arbor channel 36 via a protuberance or threading, for example. As shown in FIGS. 11 and 12, flange 30 is made from a dense polymer, such as Nylon or Delran, for example, and has slots 37 that enable flange 30 to expand in diameter as pressure is applied to the inside of flange 30 along a tapered portion 35. Flange 30 has an outer diameter of approximately ¾", a thickness of ½", and an inside portion that is frustoconical in shape and slopes inward (i.e., the diameter of the opening at the outer portion of flange 30 is larger than the diameter at the inner portion) with a slant angle between 55-65°.

Figure 9A:
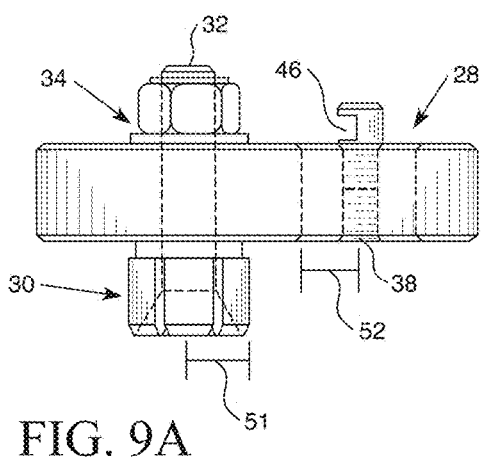
FIGS. 9A and 9B are side views of one embodiment of the invention with and without an inserted bushing.
Figure 9B:
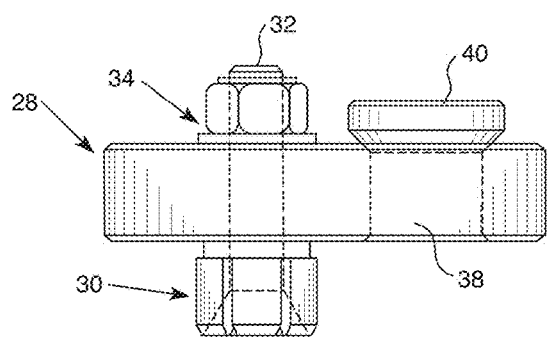
Figure 15:
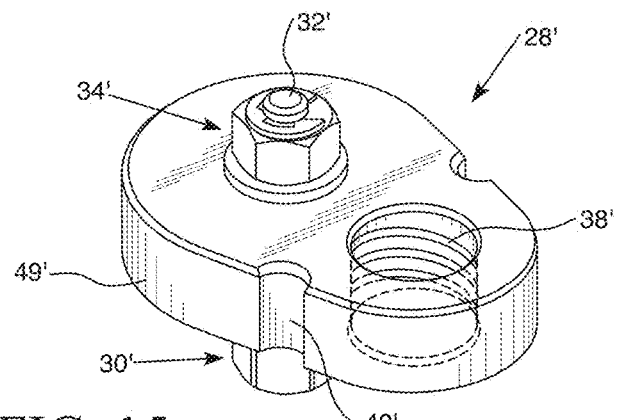
FIG. 15 is a perspective view of another embodiment of the invention.
Figure 16:
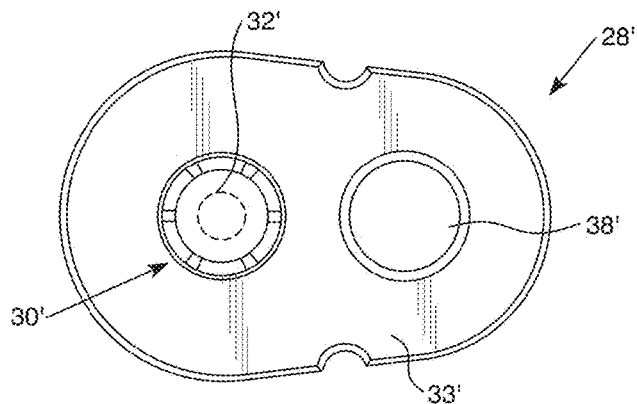
FIG. 16 is a bottom view of another embodiment of the invention.
Figure 17:
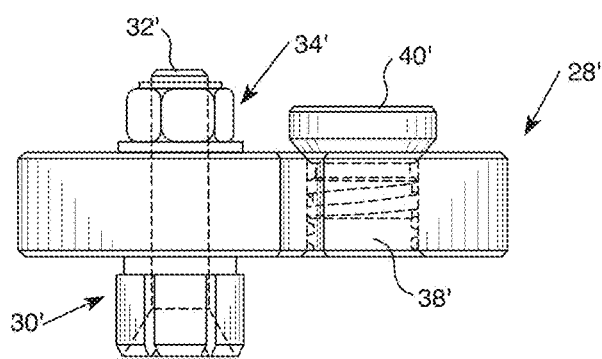
FIG. 17 is a side view of another embodiment of the invention with an inserted bushing.

Arbor 32 fits into flange 30 and arbor channel 36 as shown in FIG. 9A. In one embodiment shown in FIG. 10, arbor 32 is a 1⅜" long bolt with a ⅜" diameter threaded top end 39 and a frustoconical bottom end 41 that tapers to a diameter of approximately ⅔". Nut 34 screws onto threaded top end 39, which draws arbor 32 upwards and into plate 29 as it is tightened. Tapered bottom end 41 is frustoconical in shape and sized to mate with tapered portion 35 of flange 30. It has been found that the optimal slant angle 47 of the taper is between 55-65°, which provides a performance advantage over other angles by balancing the ease of rotating nut 34 with the expansion of flange 30. A larger taper angle provides less expansive force and requires greater rotation of nut 34, while a smaller taper angle provides more expansive force and makes it more difficult to rotate nut 34. Experimentation with various other angles has revealed that this angular range offers a performance advantage over other taper angles, allowing ease of securely attaching tool 28 with only a moderate rotation of nut 34. After arbor 32 is placed in flange 30 and arbor channel 36, it is secured to tool 28 with nut 34. As nut 34 is tightened onto tool 28, it draws arbor 32 upwards against flange 30. Because flange 30 is made from an expandable material, the diameter of flange 30 increases with the tightening of nut 34.

Arbor channel 36 is sized and positioned such that it allows arbor 32 and flange 30 to fit inside fuel injector hole 24. Repair guide 38 is sized and positioned such that it is adjacent to arbor channel 36 to facilitate repair of injector hold-down bolt hole 26, but does not impinge on or overlap with fuel injector hole 24 or flange 30. Flange 30 is centered on arbor channel 36 and has a diameter that is essentially the same as fuel injector hole 24. As shown in FIG. 9A, the center of repair guide 38 is positioned away from the center of arbor channel 36 by a distance that is greater than the combined length (or sum of) of radius 51 of flange 30 and radius 52 of repair guide 38. Note that in the case of a repair guide that has a non-circular cross section, the repair guide 38 is positioned away from the center of arbor channel 36 by a distance that is greater than the combined length (or sum of) of radius 51 of flange 30 and effective radius 52 of repair guide 38, where effective radius 52 is the distance between the center of repair guide 38 and the furthest extent of guide 38 on the side closest to arbor channel 36. In the case of a cylindrical repair guide, the effective radius would be the same as the radius of the repair guide. Because injector hold-down bolt hole 26 is separate and distinct from fuel injector hole 24, repair guide 38 does not overlap or otherwise impinge on fuel injector hole 24 or flange 30.

A second embodiment of the invention is shown in FIGS. 12-17. This second embodiment 28' has a threaded repair guide 38' instead of a smooth hole, which accepts a threaded bushing 40'. Because repair guide 38' is threaded, there is no need for pin 46. Plate 29' is approximately 3" long, 2" wide, and ½" thick. Again, other shapes and sizes of plate 29' can also fall within the scope of the invention, as long as they can enable plate 29' to be attached to fuel injector hole 24 and enable the repair of injector hold-down bolt hole 26 without interfering with other components inside engine 10.

Tool 28' is also comprised of an approximately ¾" diameter arbor channel 36' (which is located on the larger lobe of plate 29') and an approximately ¾" diameter repair guide 38' (which is located on the smaller lobe of plate 29'). Different sizes and shapes of arbor channel 36' and repair guide 38' are possible and can fall within the scope of the invention. Like with tool 28, tool 28' also has a similar flange 30', arbor 32', nut 34', arbor channel 36', and repair guide 38' that are located in similar positions and perform similar functions.

Figure 20:
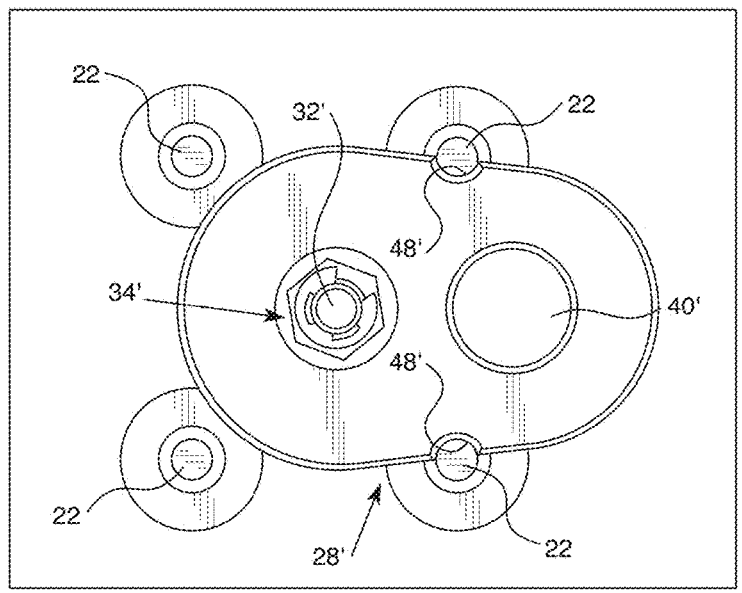
FIG. 20 is a top view of another embodiment of the invention positioned above the fuel injector and fuel injector hold-down bolt holes.

The second embodiment functions in the same manner as the first, however it also contains alignment guides 48' along the sides 49' of plate 29'. As shown in FIG. 13, alignment guides 48' are separate and distinct from repair guide 38'. As shown in FIG. 20, alignment guides 48' are approximately 9/32" diameter semi-circular grooves or channels that are sized to fit with and alongside an extending portion of valve springs 22 in order to better align tool 28' with injector hold-down bolt hole 26. Alignment guides 48' can both position tool 28' so that repair guide 38' is centered over fuel injector hold-down bolt hole 26 and help to prevent tool 28' from rotating during repairs. While alignment guides 48' are semi-circular in shape in this embodiment, other shapes and sizes could be used (such as semi-oval, semi-hexagonal, etc.) and fall within the scope of this invention. In addition, a single alignment guide could be used and fall within the scope of this invention.

Figure 21A:
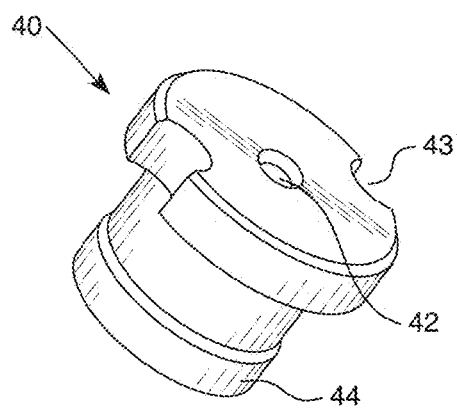
FIGS. 21A and 21B are examples of two kinds of bushings.
Figure 21B:
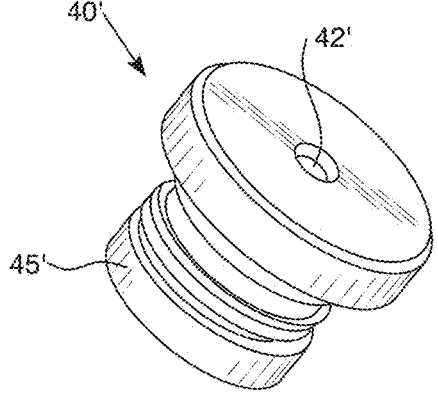
Figure 22:
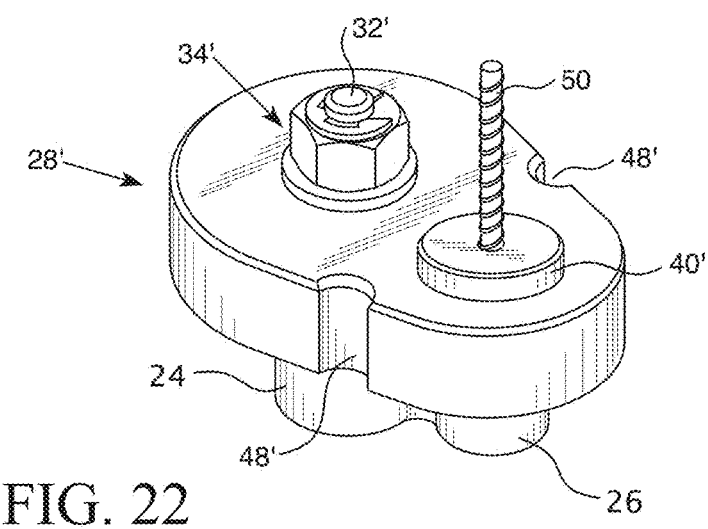
FIG. 22 is a perspective view of another embodiment of the invention mounted in an engine with a repair tool in the bushing.

In one embodiment of the invention, bushing 40 is placed in repair guide 38 and is designed such that it locks into or around pin 46 via indentations 43 to avoid movement during repairs. In another embodiment, bushing 40' screws into repair guide 38'. As shown in FIGS. 21A and 21B, bushing 40/40' is a precision aligned piece with an internal bushing hole 42/42' that has an internal diameter that is sized to accept the appropriate repair tool for the repair task needed and an external lower diameter that is sized to fit within repair guide 38/38'. For instance, bushing 40/40' can have an internal diameter that is of the precise size to accept the correct diameter drill bit to drill out a broken injector hold-down bolt 16A stuck in injector hold-down bolt hole 26, as shown in FIG. 22. By being of the precise size, the drill bit will be accurately guided to precisely drill out the damaged injector hold-down bolt 16A from injector hold-down bolt hole 26. A different bushing 40/40' can then be inserted into repair guide 38/38' that is appropriately sized to accept a tap to re-tap the threads in injector hold-down bolt hole 26 once the damaged injector hold-down bolt 16A has been removed from hold-down bolt hole 26. Other sizes of bushing holes 42/42' can be used to accommodate different sizes and types of tools as needed. Bushing 40/40' can fit into repair guide 38/38' either through a cylindrical end 44 or a threaded end 45', among other mechanisms. While bushings 40/40' are generally cylindrical in shape, other sizes and shapes of bushings (such as generally square, rectangular, hexagonal, oval, etc.) can be used to accommodate various tools as needed to make the repairs needed. By using a removable bushing 40/40', tool 28/28' is more flexible and can facilitate different kinds of repairs as needed. Alternatively, one could avoid bushing 40 entirely and use repair guide 38 as the guide for making the repairs. In addition, while pin 46 serves a useful function of securing and aligning bushing 40 in repair guide 38, the invention can encompass embodiments without pin 46. For instance, if repair guide 38 were a square or other shaped channel, then bushing 40 could have an outer shape to match that would not rotate within repair guide 38 when inserted into repair guide 38.

Figure 19:
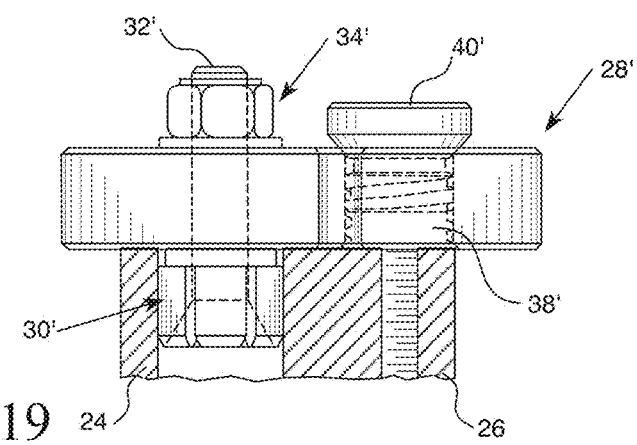
FIG. 19 is a side view of another embodiment of the invention secured in a fuel injector hole.

A technician or other individual can repair injector hold-down bolt hole 26 using tool 28' using the following method. After the technician removes the fuel lines, fuel injectors 12, injector hold-down bolts 16, valve cover 18, and the corresponding valve train necessary to get access to the broken injector hold-down bolt 16A, he or she removes any exposed portion of the broken injector hold-down bolt 16A from injector hold-down bolt hole 26 such that any remaining portion of the broken injector hold-down bolt 16A is flush, flat, and even with the surface of the cylinder head. As shown in FIG. 19, the technician next attaches assembled tool 28' to fuel injector hole 24 by placing flange 30' of tool 28' into fuel injector hole 24, orienting tool 28' until repair guide 38' aligns with injector hold-down bolt hole 26 (in this embodiment, by using alignment guides 48' to align with valve springs 22), and rotating/tightening nut 34' until tool 28' is rigidly fixed or secured in fuel injector hole 24. The technician can then insert bushing 40' into repair guide 38' in tool 28'. As shown in FIG. 22, the technician next inserts the appropriate repair tool 50 (e.g., a drill bit or tap) through the appropriate bushing 40' sized for repair tool 50 to conduct the repairs on injector hold-down bolt hole 26. For example, the technician can first drill out the broken injector hold-down bolt 16A from injector hold-down bolt hole 26. Next, the technician can clean out injector hold-down bolt hole 26 before inserting a tap through bushing 40' to re-tap the threads in injector hold-down bolt hole 26. After cleaning out injector hold-down bolt hole 26, the technician can remove tool 28' from fuel injector hole 24 by loosening nut 34'. The loosening of nut 34' causes flange 30' to shrink and become loose in fuel injector hole 24. Once tool 28' has been removed from engine 10 and the engine cleaned up, the technician can reassemble the engine and reinsert fuel injectors 12 into the engine. As one of ordinary skill in the art would recognize, technicians can perform additional steps within this process to repair, clean, or maintain the engine as necessary.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An apparatus for repairing a fuel injector, comprising:
   a plate with a top surface and a bottom surface;
   an arbor channel located in the plate;
   a flange that protrudes from the bottom surface of the plate about the arbor channel and that has a flange radius;
   a repair guide located in the plate that extends from the top surface through the bottom surface and that has an effective radius, wherein the center of the repair guide is separated from the center of the arbor channel by a distance greater than the sum of the flange radius and the effective radius; and
   an arbor extending through the flange and the arbor channel.

2. The apparatus of claim 1, wherein the plate is generally in the shape of an ovoid cylinder.

3. The apparatus of claim 1, wherein the flange contains a plurality of slots.

4. The apparatus of claim 1, wherein the arbor is comprised of a threaded end and a frustoconical end.

5. The apparatus of claim 4, further comprising a nut attached to the threaded end of the arbor.

6. The apparatus of claim 4, wherein the frustoconical end has a slant angle between 55° and 65°.

7. The apparatus of claim 1, wherein the repair guide is threaded.

8. The apparatus of claim 1, further comprising a bushing configured to fit inside the repair guide.

9. The apparatus of claim 8, wherein the bushing is generally cylindrical in shape.

10. The apparatus of claim 8, wherein the bushing is generally rectangular in shape.

11. The apparatus of claim 8, further comprising a pin extending from the top surface that connects to the bushing when the bushing is in the repair guide.

12. The apparatus of claim 1, further comprising an alignment guide separate and distinct from the repair guide.

13. The apparatus of claim 12, wherein the plate has a side and the alignment guide is located along the side.

14. The apparatus of claim 13, wherein the alignment guide is comprised of a semi-circular channel.

15. The apparatus of claim 1, wherein the plate has two sides and further comprising an alignment guide along each side.

16. A method for repairing a fuel injector hold-down bolt hole, comprising:
   removing a fuel injector from an engine;
   placing an apparatus comprised of
      a plate with a top surface and a bottom surface;
      an arbor channel located in the plate;
      a flange that protrudes from the bottom surface of the plate about the arbor channel and that has a flange radius;
      a repair guide located in the plate that extends from the top surface through the bottom surface and that has an effective radius, wherein the center of the repair guide is separated from the center of the arbor channel by a distance greater than the sum of the flange radius and the effective radius; and
      an arbor extending through the flange and the arbor channel into a fuel injector passage in the engine by placing the flange in the fuel injector passage;
   aligning the apparatus so that the repair guide is aligned with the fuel injector hold-down bolt hole in the engine;
   securing the apparatus into the fuel injector passage;
   inserting a repair tool through the repair guide;
   repairing the fuel injector hold-down bolt hole with the repair tool; and
   removing the apparatus after repairing the fuel injector hold-down bolt hole.

17. The method of claim 16, wherein
   the apparatus is further comprised of a nut screwed onto the arbor; and
   the step of securing the apparatus into the fuel injector passage is further comprised of rotating the nut.

18. The method of claim 16, wherein
   the apparatus is further comprised of a bushing inserted into the repair guide; and
   the step of inserting the repair tool through the repair guide is further comprised of inserting the repair tool through the bushing in the repair guide.

19. The method of claim 16, wherein
   the apparatus further consists of the plate having a side and an alignment guide located in the side; and
   the step of aligning the apparatus is further comprised of using the alignment guide to align the apparatus.

* * * * *